US012614082B2

(12) United States Patent
Sugawara et al.

(10) Patent No.: US 12,614,082 B2
(45) Date of Patent: Apr. 28, 2026

(54) DATA PROCESSING DEVICE, DATA PROCESSING SYSTEM, AND DATA PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Katsuya Sugawara, Kawasaki (JP); Kenichiro Yamada, Minato (JP); Tomoyuki Maeda, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 959 days.

(21) Appl. No.: 17/812,280

(22) Filed: Jul. 13, 2022

(65) Prior Publication Data

US 2023/0244959 A1     Aug. 3, 2023

(30) Foreign Application Priority Data

Feb. 1, 2022    (JP) ................................. 2022-013908

(51) Int. Cl.
*G06N 5/022* (2023.01)
(52) U.S. Cl.
CPC ..................................... *G06N 5/022* (2013.01)
(58) Field of Classification Search
CPC ........... G06N 5/022; G06N 3/08; G06N 7/01; G06N 20/00; G06N 20/10; G06N 20/20
See application file for complete search history.

(56) References Cited

U.S. PATENT DOCUMENTS

2019/0080261 A1 *  3/2019  Wang ...................... G06N 20/10
2021/0042412 A1 *  2/2021  Isoyama ................ G06N 20/20
(Continued)

FOREIGN PATENT DOCUMENTS

CN        109840540 A      6/2019
CN        113919886 A      1/2022
(Continued)

OTHER PUBLICATIONS

Japanese Office Action issued Mar. 7, 2025 in Japanese Patent Application No. 2022-013908 (with unedited computer-generated English Translation), 8 pages.
(Continued)

*Primary Examiner* — Abdullah Al Kawsar
*Assistant Examiner* — Gisel Gabriela Faccenda
(74) *Attorney, Agent, or Firm* — Oblon, McClelland, Maier & Neustadt, L.L.P.

(57) ABSTRACT

According to one embodiment, a data processing device includes a processor. The processor acquires first features corresponding to a first classification label and second features corresponding to a second classification label. The processor selects at least a part of the first features from the first features, and at least a part of the second features from the second features. The processor performs a first operation. In the first operation, a first number of the at least a part of the selected first features is not less than 1.1 times and not more than 2 times a second number of the at least a part of the selected second features. The processor generates a first machine learning model based on first training data based on the at least a part of the selected first and second features.

17 Claims, 6 Drawing Sheets

(56)     References Cited

U.S. PATENT DOCUMENTS

| | | | |
|---|---|---|---|
| 2021/0149995 A1* | 5/2021 | Misra | G06N 5/025 |
| 2021/0150412 A1* | 5/2021 | Rashidi | G06N 20/00 |
| 2021/0264319 A1* | 8/2021 | Cao | G06N 20/20 |
| 2022/0351066 A1* | 11/2022 | Bikumala | G06Q 10/20 |

FOREIGN PATENT DOCUMENTS

| | | |
|---|---|---|
| JP | 2019-028876 A | 2/2019 |
| JP | 2021-149719 A | 9/2021 |
| WO | WO 2021/225097 A1 | 11/2021 |

OTHER PUBLICATIONS

Combined Chinese Office Action and Search Report issued Oct. 14, 2025 in Chinese Patent Application No. 202210904301.1, (with unedited computer-generated English translation), 11 pages.

\* cited by examiner

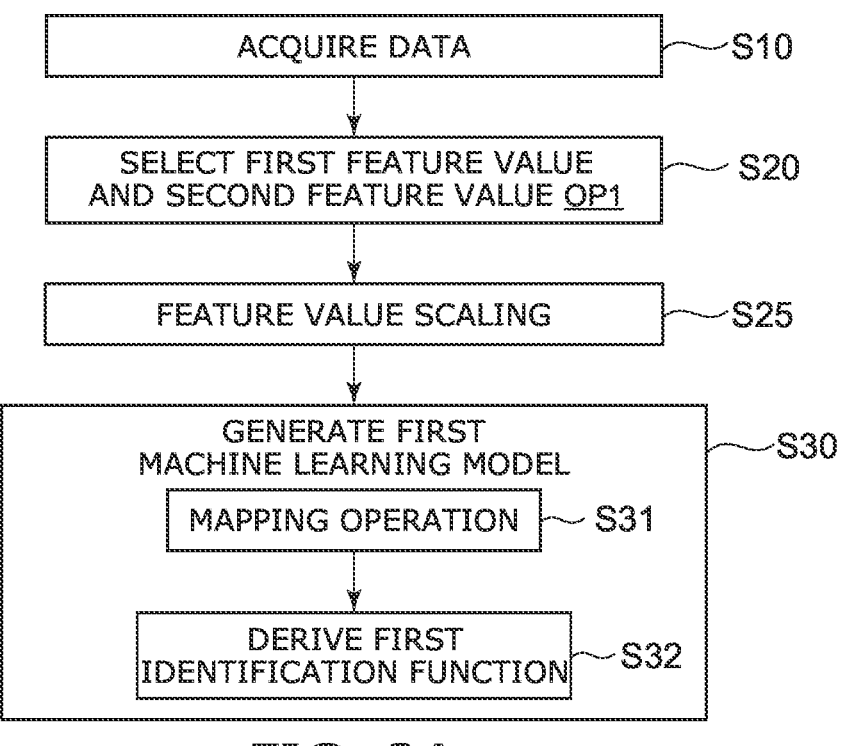

ACQUIRE DATA — S10

SELECT FIRST FEATURE VALUE
AND SECOND FEATURE VALUE OP1 — S20

FEATURE VALUE SCALING — S25

GENERATE FIRST
MACHINE LEARNING MODEL — S30

MAPPING OPERATION — S31

DERIVE FIRST
IDENTIFICATION FUNCTION — S32

FIG. 2A

ACQUIRE DATA — S10A

SELECT THIRD FEATURE VALUE
AND FOURTH FEATURE VALUE OP2 — S20A

FEATURE VALUE SCALING — S25A

GENERATE SECOND
MACHINE LEARNING MODEL — S30A

MAPPING OPERATION — S31A

DERIVE SECOND
IDENTIFICATION FUNCTION — S32A

FIG. 2B

DATA PROCESSING DEVICE, DATA PROCESSING SYSTEM, AND DATA PROCESSING METHOD

CROSS-REFERENCE TO RELATED APPLICATIONS

This application is based upon and claims the benefit of priority from Japanese Patent Application No.2022-013908, filed on Feb. 1, 2022; the entire contents of which are incorporated herein by reference.

FIELD

Embodiments described herein relate generally to a data processing device, a data processing system, and a data processing method.

BACKGROUND

For example, a machine learning model is generated based on processed data. Various events are classified based on a machine learning model. It is desired to improve the accuracy of data processing.

BRIEF DESCRIPTION OF THE DRAWINGS

FIGS. 2A and 2B are flow charts illustrating the operation of the data processing device according to the first embodiment;

DETAILED DESCRIPTION

Figure 1:
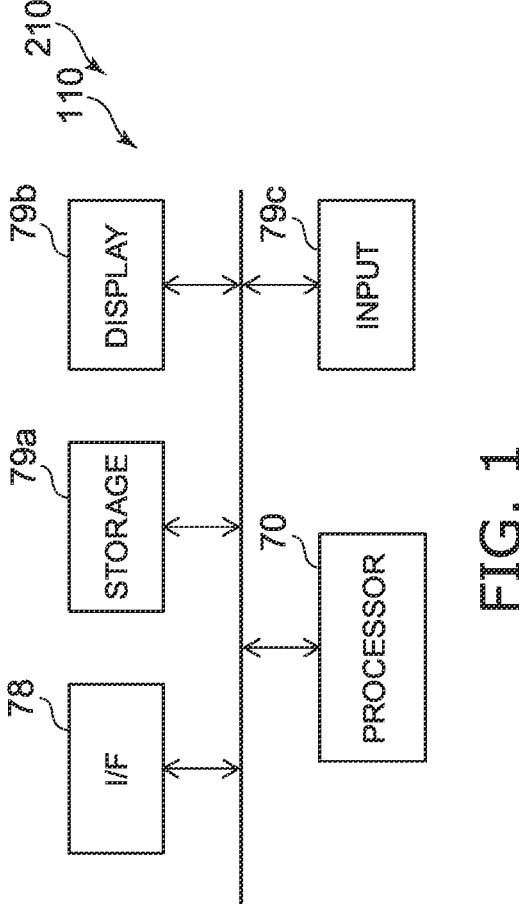
FIG. 1 is a schematic cross-sectional view illustrating a data processing device according to a first embodiment.

According to one embodiment, a data processing device includes a processor. The processor is configured to acquire a plurality of first features corresponding to a first classification label and a plurality of second features corresponding to a second classification label. The processor is configured to select at least a part of the first features from the first features, and configured to select at least a part of the second features from the second features. The processor is configured to perform a first operation. In the first operation, a first number of the at least a part of the selected first features is not less than 1.1 times and not more than 2 times a second number of the at least a part of the selected second features. The processor is configured to generate a first machine learning model based on first training data based on the at least a part of the selected first features and the at least a part of the selected second features.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a data processing device according to a first embodiment.

As shown in FIG. 1, a data processing device 110 according to the embodiment includes a processor 70. Multiple elements included in the data processing device 110 may be provided in multiple different locations. The data processing device 110 may be a part of a data processing system 210. The data processing system 210 may include, for example, multiple processors 70. A part of the multiple processors 70 may be provided at a place different from another part of the multiple processors 70.

The processor 70 may include, for example, a CPU (Central Processing Unit). The processor 70 includes, for example, an electronic circuit or the like.

In this example, the data processing device 110 includes an acquisition part 78. The acquisition part 78 is configured to acquire various data, for example. The acquisition part 78 includes, for example, an I/O port. The acquisition part 78 is an interface. The acquisition part 78 may have a function of an output part. The acquisition part 78 may have, for example, a communication function.

In this example, the data processing device 110 includes a storage 79a. The storage 79a is configured to hold various data. The storage 79a may be, for example, a memory. The storage 79a may include at least one of a ROM (Read Only Memory) or a RAM (Random Access Memory).

The data processing device 110 may include a display 79b, an input 79c, and the like. The display 79b may include various displays. The input 79c includes, for example, a device having an operation function (for example, a keyboard, a mouse, a touch input panel, a voice recognition input device, or the like).

The multiple elements included in the data processing device 110 is configured to communicate with each other by at least one of wireless or wired methods. The locations where the multiple elements included in the data processing device 110 are provided may be different from each other. As the data processing device 110, for example, a general-purpose computer may be used. As the data processing device 110, for example, multiple computers connected to each other may be used. A dedicated circuit may be used as at least a part of the data processing device 110 (for example, the processor 70 or the like). As the data processing device 110, for example, multiple circuits connected to each other may be used.

In the following, an example of the operation of the processor 70 in the data processing device 110 (for example, the data processing system 210) will be described.

FIGS. 2A and 2B are flow charts illustrating the operation of the data processing device according to the first embodiment.

These figures illustrate the operation of the processor 70. These figures show an example of a learning operation performed by the processor 70.

As shown in FIG. 2A, the processor 70 is configured to acquire data (step S10). For example, the data is supplied to the acquisition part 78 (I/O port, etc., see FIG. 1). The data acquired by the acquisition part 78 is supplied to the processor 70.

The data includes, for example, multiple first features corresponding to a first classification label and multiple second features corresponding to a second classification label. The first classification label is, for example, a first class classification label. The second classification label is a second class classification label. The multiple first features are, for example, multiple first feature vectors. The multiple second features are, for example, multiple second feature vectors. Each of the multiple first features may include multiple elements. Each of the multiple second features may include multiple elements.

As shown in FIG. 2A, the processor 70 can select at least a part of the multiple first features from the multiple first features, and select at least a part of the multiple second features from the multiple second features (step S20).

At the time of selection, the processor 70 is configured to perform a first operation OP1. In the first operation OP1, a first number of the above-mentioned at least a part of the selected multiple first features is not less than 1.1 time and not more than 2 times a second number of the above-mentioned at least a part of the selected multiple second features.

As shown in FIG. 2A, the processor 70 is configured to generate a first machine learning model based on a first training data (step S30). The first training data is based on the above-mentioned at least a part of the selected multiple first features and the above-mentioned at least a part of the selected second features.

For example, the data processing device 110 targets data related to multiple events. The multiple target events include, for example, multiple first events corresponding to the first classification label and multiple second events corresponding to the second classification label. The multiple first events correspond to, for example, a normal product (good product) of the object. The multiple second events correspond to, for example, a non-normal product (defective product) of the object.

For example, various data regarding the object classified as the normal product corresponds to the multiple first features. For example, various data regarding the object classified as the non-normal product corresponds to the multiple second features. The machine learning model is generated using such multiple first features and multiple second features as the training data.

Generally, when generating the training data, the number of the multiple first features is the same as the number of the multiple second features. The machine learning model is generated by adjusting, for example, hyperparameters using the same number of the multiple first features and the multiple second features. The generation of the machine learning model corresponds to, for example, derivation of a classifier.

As will be described later, according to the inventor's study, it has been found that it is difficult to generate a highly accurate machine learning model when the multiple first features and the multiple second features of the same number are used. For example, it has been found that it is difficult to derive a highly accurate classifier even if hyper-parameters are adjusted. In the embodiment, the same number of the multiple first features and the multiple second features are not used. In the embodiment, the number of the multiple first features is different from the number of the multiple second features. At least a part of the multiple first features is selected and at least a part of the multiple second features so that the numbers are different. In other words, a part of the acquired data (the multiple first features before selection and the multiple second features before selection) is not used as the training data.

In the first operation OP1, the first number of the above-mentioned at least a part of the selected multiple first features is not less than 1.1 times and not more than 2 times the second number of the above-mentioned at least a part of the selected multiple second features.

By using different numbers of data as the training data in this way, a highly accurate machine learning model can be obtained. For example, a highly accurate classifier can be obtained. According to the embodiment, for example, a data processing device and a data processing system can be provided in which the accuracy is possible to be improved.

As described above, the multiple target events include, for example, multiple first events corresponding to the first classification label and multiple second events corresponding to the second classification label. For example, a first incidence of the multiple first events in the multiple events is higher than a second incidence of the multiple second events in the multiple events. For example, the first incidence of the first event (normal product) is higher than the second incident of the second event (non-normal product).

For example, in such a situation, for example, the first operation OP1 is performed. That is, in the first operation OP1, the first incidence of the multiple first events is higher than the second incidence of the multiple second events in the multiple events. In the first operation OP1, the first number (the number of the selected multiple first features) is larger than the second number (the number of the selected multiple second features). High accuracy can be obtained by such a first operation OP1.

In one example, in the first operation OP1, the first incidence corresponds to the incidence of the normal product of the object, and the second incidence corresponds to the incidence of the non-normal product of the object.

According to the first machine learning model by the first operation OP1 described above, for example, "normal" can be determined as "normal" with high accuracy. For example, a highly accurate true negative (TN: True Negative) can be obtained.

As shown in FIG. 2A, the processor 70 may perform feature scaling (step S25). For example, the first training data are based on multiple quantities obtained by performing feature scaling process on the multiple first features, and multiple quantities obtained by performing feature scaling process on the multiple second features. The multiple quantities is, for example, multiple vectors. The generation of the first machine learning model (step S30) is performed based on the multiple quantities obtained by the feature scaling process. The feature scaling process may include, for example, at least one of normalization or standardization.

As shown in FIG. 2A, the generation of the first machine learning model (step S30) may include mapping operation of the above-mentioned at least a part of the selected multiple first features (for example, the quantity by the feature scaling process may be used), and the above-mentioned at least a part of the multiple second features (for example, the quantity by the feature scaling process may be used) to the feature space (step S31).

The mapping operation may include, for example, at least one of a kernel function or a neural network function. The mapping operation may include, for example, at least one of a kernel function, t-SNE (t-Distributed Stochastic Neighbor Embedding), or UMAP (Uniform Manifold Approximation and Projection).

The above kernel functions may include, for example, at least one of a linear kernel, a polynomial kernel, a Gaussian kernel, a sigmoid kernel, a Laplace kernel, or a Matern kernel.

As shown in FIG. 2A, the generation of the first machine learning model (step S30) may include the derivation of the first classifier of the quantity after the mapping operation (step S32). The first classifier is a classifier relating to the first classification label and the second classification label.

The derivation of the first classifier may be based on, for example, at least one of SVM (Support Vector Machine) and neural network (NN), SDG (Stochastic Gradient Descent) Classifier, kNN (k-Nearest Neighbor) Classifier, or Naive Bayes classifier. For example, the first classifier is configured to be derived by at least one of SVM or NN.

In the data processing device 110 (and the data processing system 210), an operation different from the above-mentioned first operation OP1 may be performed.

As shown in FIG. 2B, the processor 70 is configured to acquire data (step S10A). The data includes, for example, multiple third features corresponding to the first classification label and multiple fourth features corresponding to the second classification label. The multiple third features are, for example, multiple third feature vectors. The multiple fourth features are, for example, multiple fourth feature vectors. Each of the multiple third features may include multiple elements. Each of the multiple fourth features may include multiple elements. In this way, the processor 70 can further acquire multiple third features corresponding to the first classification label and multiple fourth features corresponding to the second classification label (step S10A).

As shown in FIG. 2B, the processor 70 can select at least a part of the multiple third features from the multiple third features, and can select at least a part of the multiple fourth features from the multiple fourth features (step S20A). At this time, the processor 70 is configured to perform the second operation OP2. In the second operation OP2, the third number of the above-mentioned at least a part of the selected multiple third features is not less than 0.1 times and not more than 0.9 times the fourth number of the above-mentioned at least a part of the selected multiple fourth features. As described above, in the second operation OP2, the number of the selected multiple third features (third number) corresponding to the first classification label is smaller than the number of the selected multiple fourth features (fourth number) corresponding to the second classification label.

The processor 70 is further configured to generate a second machine learning model based on the second training data (step S30A). The second training data is based on the above-mentioned at least a part of the selected multiple third features and the above-mentioned at least a part of the selected multiple fourth features.

For example, the multiple target events include multiple third events corresponding to the first classification label and multiple fourth events corresponding to the second classification label. The multiple third events correspond to, for example, normal products. The multiple fourth events correspond to, for example, a non-normal product.

In the second operation OP2, the incidence of the multiple third events in the multiple events (third incidence) is lower than, for example, the incidence of the multiple fourth events in the multiple events (fourth incidence). For example, in the second operation OP2, the third incidence corresponds to the incidence of a normal product of the object. The fourth incidence corresponds to the incidence of non-normal products of the object.

For example, in the initial stage of production, the incidence of normal products may be lower than the incidence of non-normal products. In such a case, the number (third number) of the multiple third features corresponding to a normal product (third event) having a low incidence is made smaller than the number (fourth number) of the multiple fourth features corresponding to the non-normal products (fourth event) having a high incidence. This makes it possible to generate a machine learning model with higher accuracy.

According to the second machine learning model based on the second operation OP2 described above, for example, "abnormality" can be determined as "abnormality" with a high accuracy. For example, a highly accurate true positive (TP: True Positive) can be obtained.

As shown in FIG. 2B, the processor 70 may perform feature scaling (step S25A). For example, the second training data is based on multiple quantities obtained by performing feature scaling process on the multiple third features, and multiple quantities obtained by performing feature scaling process on the multiple fourth features. The multiple quantities are, for example, multiple vectors. The generation of the second machine learning model (step S30A) is performed based on the multiple quantities obtained by the feature scaling process. The feature scaling process may include, for example, at least one of normalization or standardization.

As shown in FIG. 2B, the generation of the second machine learning model (step S30A) may include a mapping operation (step S31A) of the above-mentioned at least a part of the selected multiple third features (for example, the quantity by the feature scaling process may be used) and the above-mentioned at least a part of the multiple fourth features (for example, the quantity by the feature scaling process may be used) to the feature space (step S31A).

The mapping operation may include, for example, at least one of a kernel function or a neural network function. The mapping operation may include at least one operation of a kernel function, t-SNE (t-Distributed Stochastic Neighbor Embedding), or UMAP (Uniform Manifold Approximation and Projection).

The above kernel function may include, for example, at least one of a linear kernel, a polynomial kernel, a Gaussian kernel, a sigmoid kernel, a Laplace kernel, or a Matern kernel.

As shown in FIG. 2B, the generation of the second machine learning model (step S30A) may include the derivation of the second classifier of the quantity after the mapping operation (step S32A). The second classifier is a classifier relating to the first classification label and the second classification label.

The derivation of the second classifier may be based on, for example, at least one of SVM (Support Vector Machine) and neural network (NN), SDG (Stochastic Gradient Descent) Classifier, kNN (k-Nearest Neighbor) Classifier, or Naive Bayes classifier. For example, the second classifier is configured to be derived by at least one of SVM or NN.

At least one of the generation of the first machine learning model and the generation of the second machine learning model may include adjustment of hyperparameters.

Such first operation OP1 and second operation OP2 may be switched and performed.

Figure 3:
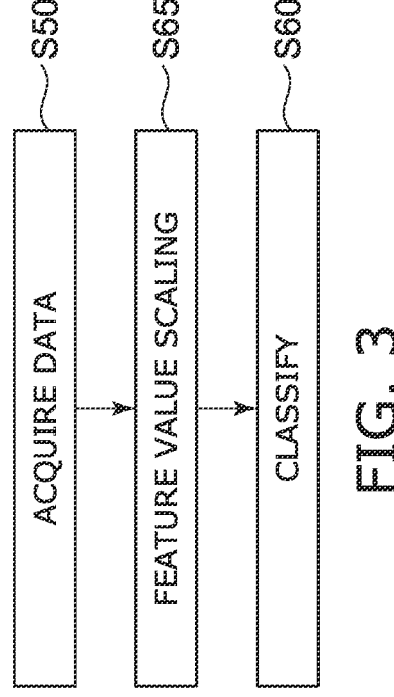
FIG. 3 is a flow chart illustrating the operation of the data processing device according to the first embodiment.

FIG. 3 is a flowchart illustrating the operation of the data processing device according to the first embodiment.

FIG. 3 shows an example of another operation performed by the processor 70. FIG. 3 illustrates, for example, a classification operation (or a prediction operation).

The processor 70 can further perform the classification operation. In the classification operation, another data (another feature) is configured to be acquired (step S50). Another feature is a new feature acquired separately from the learning operation. Another feature is, for example, an unknown feature. Another feature is, for example, another feature vector. Another feature may include, for example, multiple elements.

The processor 70 classifies another feature into the first classification label or the second classification label based on the first classifier derived by the learning operation (step S60). As described above, in the classification operation, the processor 70 is configured to classify another feature into the first classification label or the second classification label based on the first machine learning model.

As shown in FIG. 3, the above-mentioned other feature may be obtained by feature scaling new data obtained by the processor 70 (step S65).

In the embodiment, the training data based on the first operation OP1 or the second operation OP2 described above classifies another new feature by the machine learning model (for example, classifier). Highly accurate classification is possible.

In the embodiment, the multiple first features and the multiple second features may be features relating to the characteristics of the magnetic recording device. For example, the "other feature" in the classification operation may be a feature related to the characteristics of the magnetic recording device. The features related to the characteristics of the magnetic recording device may include, for example, at least one of Signal-Noise Ratio (SNR), Bit Error Rate (BER), Fringe BER, Erase Width at AC erase (EWAC), Magnetic write track width (MWW), Overwrite (OW), Soft Viterbi Algorithm-BER (SOVA-BER), Viterbi Metric Margin (VMM), Repeatable RunOut (RRO), or Non-Repeatable RunOut (NRRO).

For example, in a magnetic recording device, there is a magnetic head that causes poor recording characteristics. It is desired to predict the characteristics of the magnetic head with a high accuracy based on the test data on the magnetic head. Machine learning is used for such predictions. In a general machine learning prediction model, the machine learning is performed using the same number of data on normal products and data on un-normal products as training data. Then, the characteristics (performance) of the prediction model are performed by hyperparameter adjustment.

In embodiments, as described above, the number of data on normal products is different from the number of data on non-normal products. A machine learning model using such data as the training data is generated. This enables highly accurate prediction.

In the following, examples of characteristics in the data processing device will be described.

Figure 4A:
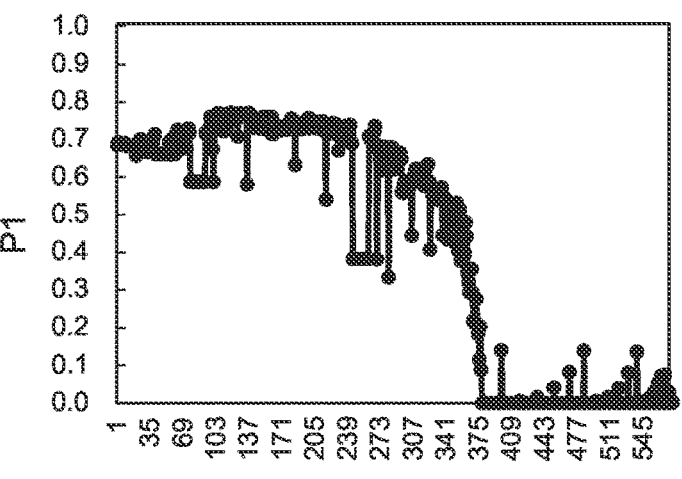
FIGS. 4A to 4C are graphs illustrating characteristics of the data processing device.
Figure 4B:
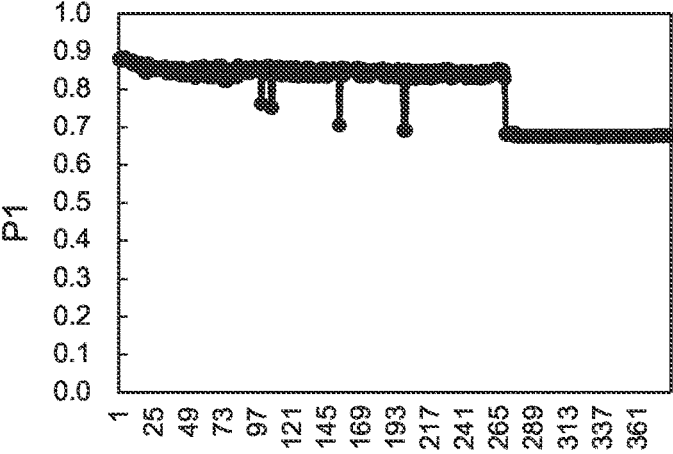
Figure 4C:
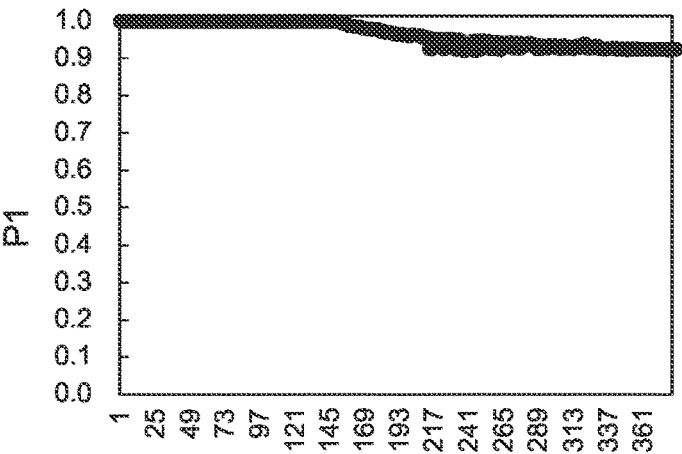

FIGS. 4A to 4C are graphs illustrating characteristics of the data processing device.

The horizontal axis of these figures corresponds to the numbers N0 (names) of multiple data. The horizontal axis of these figures corresponds to, for example, the adjustment values of hyperparameters. The vertical axis of these figures corresponds to an evaluation parameter P1. These figures relate to the true negative (TN). The fact that the evaluation parameter P1 is 1 corresponds to the fact that all normal products are correctly determined to be normal. When the evaluation parameter P1 is smaller than 1, it corresponds to the occurrence of false positive (FP: False Positive, erroneously determining normality as abnormal).

In FIG. 4A, the first number is 0.5 times the second number. As described above, the first number is a number of at least a part of the selected multiple first features. The second number is at least a part of the selected multiple second features.

In FIG. 4B, the first number is the same as the second number. In FIG. 4C, the first number is 2 times the second number. FIG. 4B corresponds to the true negative (TN) obtained by hyperparameter adjustment in general machine learning. FIG. 4C corresponds to the case where the evaluation parameter P1 becomes 1 and a prediction model in which FP does not occur can be constructed.

As shown in FIG. 4C, when the first number is 2 times the second number, the evaluation parameter P1 becomes 1 by increasing the adjustment value of the hyperparameters. A normal product is correctly determined to be normal without FP occurring.

On the other hand, as shown in FIG. 4B, when the first number is the same as the second number, the evaluation parameter P1 is about 0.7. When the first number is the same as the second number, it is difficult to obtain high accuracy even if the hyperparameters are adjusted.

In the embodiment, the evaluation parameter P1 of 1 is obtained when the first number is larger than the second number (for example, twice), this is considered to be based on the following. For example, when the prediction model erroneously determines data on a normal product, the loss function is likely to increase. When the first number is larger than the second number, the degree to which a correct answer rate of the normal product contributes to the loss reduction becomes larger than in the case where the first number is the same as the second number. As a result, it is considered that the evaluation parameter P1 of 1 is obtained when the first number is larger than the second number (for example, 2 times).

Figure 5A:
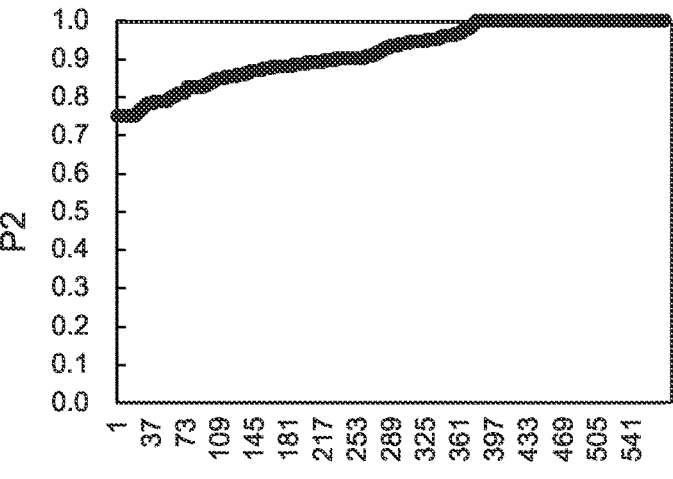
FIGS. 5A to 5C are graphs illustrating characteristics of the data processing device.
Figure 5B:
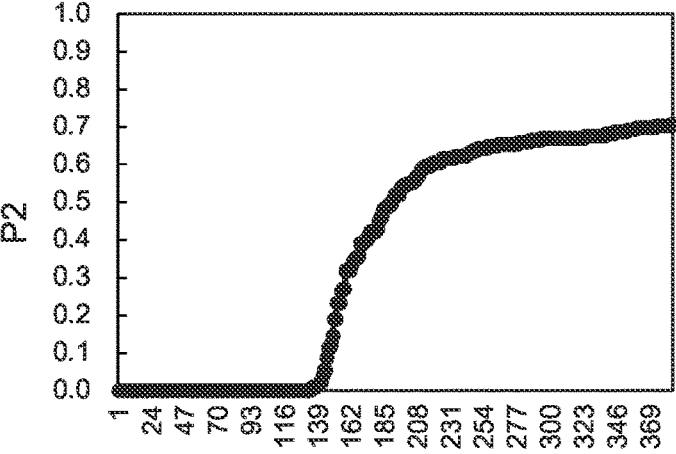
Figure 5C:
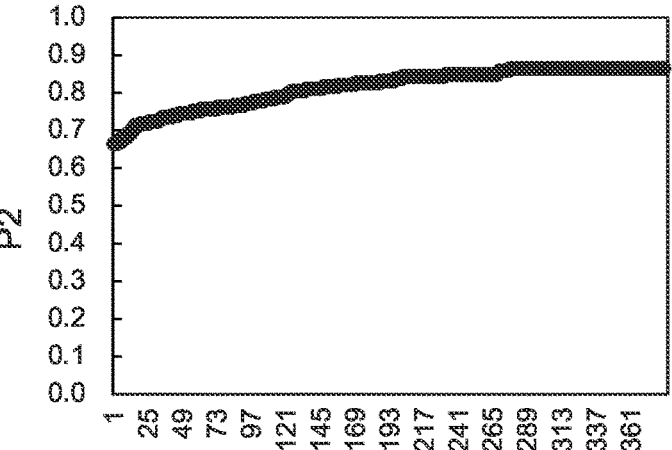

FIGS. 5A to 5C are graphs illustrating characteristics of the data processing device.

The horizontal axis of these figures corresponds to the numbers N0 (names) of multiple data. The horizontal axis of these figures corresponds to, for example, the adjustment values of hyperparameters. The vertical axis of these figures corresponds to an evaluation parameter P2. These figures relate to the true positive (TP). The fact that the evaluation parameter P2 is 1 corresponds to the fact that the non-normal product is correctly determined to be non-normal. When the evaluation parameter P2 is smaller than 1, it corresponds to the occurrence of false negative.

In FIG. 5A, the first number is 0.5 times the second number. In FIG. 5C, the first number is the same as the second number. In FIG. 5B, the first number is 2 times the second number. FIG. 5C corresponds to the true positive (TP) obtained by hyperparameter adjustment in general machine learning.

As shown in FIG. 5A, when the first number is 0.5 times the second number, the evaluation parameter P2 becomes 1 by combining with the adjustment of the hyperparameters. An un-normal product is correctly determined to be abnormal.

On the other hand, as shown in FIG. 5C, when the first number is the same as the second number, the maximum value of the evaluation parameter P2 is about 0.7 to 0.8. When the first number is the same as the second number, it is difficult to obtain high accuracy even if the hyperparameters are adjusted.

For example, when the first number is the same as the second number, in the hyperparameter adjustment, the parameters P1 and P2 are about 0.6 to 0.8 for both the true negative (TN) and the true positive (TP). By making the first and second numbers different from each other, a highly accurate true negative (TN) TN or true positive (TP) can be obtained.

In the embodiment, the evaluation parameter P2 of 1 is obtained when the first number is smaller than the second number (for example, 0.5 times). This is considered to be based on the following. For example, the loss function is likely to increase when the prediction model erroneously determines data about anomalous products. When the first number is smaller than the second number, it is considered that the degree to which the correct answer rate of the abnormal product contributes to the loss reduction is larger than in the case where the first number is the same as the second number. As a result, it is considered that the evaluation parameter P2 of 1 is obtained when the first number is smaller than the second number.

Figure 6A:
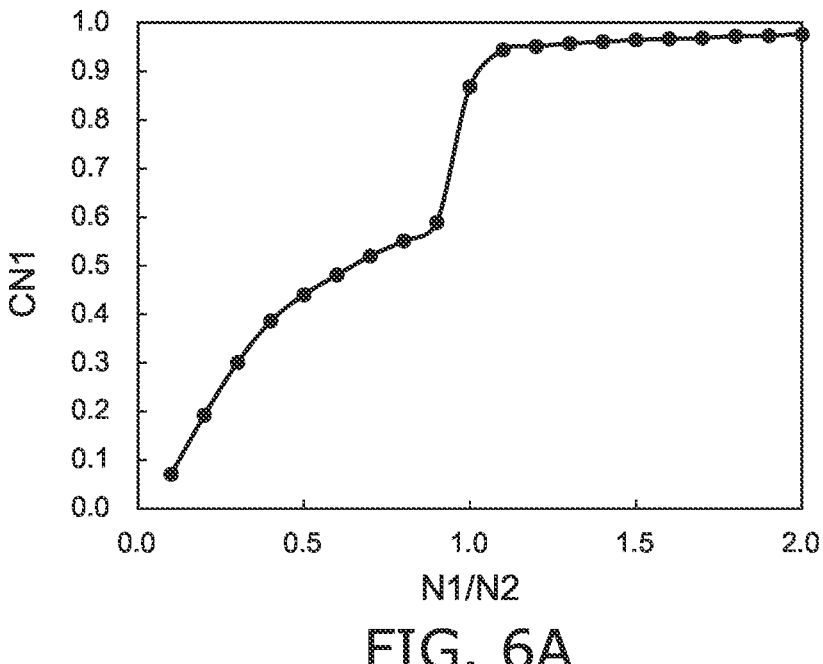
FIGS. 6A and 6B are graphs illustrating characteristics of the data processing device.
Figure 6B:
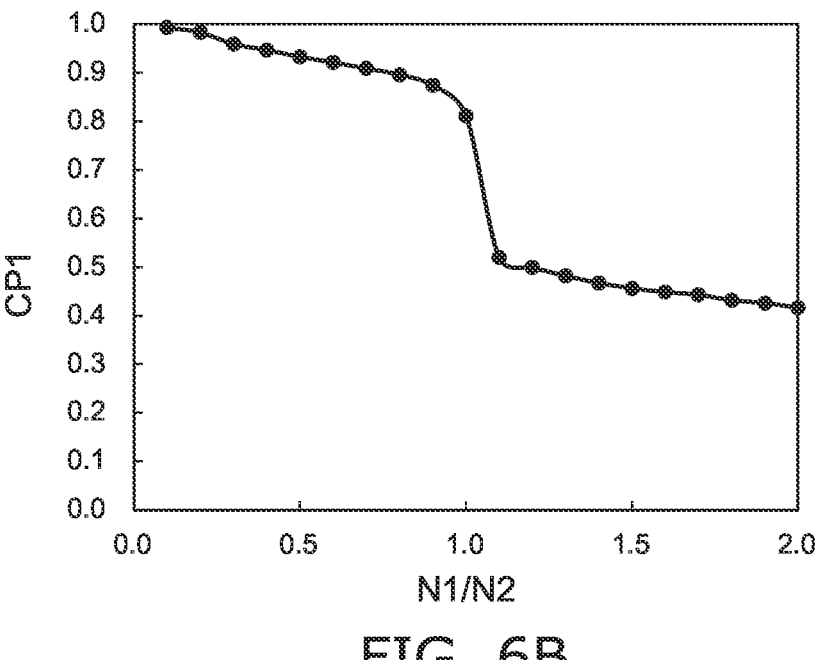

FIGS. 6A and 6B are graphs illustrating characteristics of the data processing device.

The first number is taken as N1. The second number is taken as N2. FIG. 6 illustrates the characteristics when the ratio (N1/N2) of the first number to the second number is changed. The horizontal axis of these figures is the ratio (N1/N2). The vertical axis of FIG. 6A is a parameter CN1. The parameter CN1 is an average value of true negative (TN) within the range of valid hyperparameters that do not cause overfitting. The vertical axis of FIG. 6B is a parameter CP1. The parameter CP1 is an average value of true positive (TP) within the range of valid hyperparameters that do not cause overfitting.

For example, when the incidence of normal products is high, the true negative (TN) is preferably not less than 0.9. This makes it easier to improve the yield after failure detection by machine learning, for example. As shown in FIG. 6A, when the ratio (N1/N2) is not less than 1.1 and not more than 2.0, a high parameter CN1 of not less than 0.9 can be obtained. In one example according to the embodiment, the first number is preferably 1.1 not less than times and not more than 2 times the second number. A high true negative (TN) of not less than 0.9 can be obtained.

For example, when the incidence of abnormal products is high, the true positive (TP) is preferably not less than 0.9. As shown in FIG. 6B, when the ratio (N1/N2) is not less than 0.1 and not more than 0.9, the parameter CP1 of not less than 0.9 is obtained. In one example according to the embodiment, the first number is preferably not less than 0.1 times and not more than 0.9 times the second number. A high true positive (TP) of not less than 0.9 is obtained.

In a general machine learning (reference example), the first number is the same as the second number. In this case, both the true positive (TP) and the true negative (TN) are about 0.7 to 0.8. It is considered that the reference example in which the first number is the same as the second number is suitable to be applied when the incidence of normal products is about the same as the incidence of non-normal products.

For example, when the incidence of normal products is not less than 1000 times the incidence of non-normal products, it is considered better to apply a ratio (N1/N2) of not less than 1.1 and not more than 2.0. For example, when the incidence of normal products is less than 1000 times the incidence of non-normal products, it is considered better to apply a ratio (N1/N2) of not less than 0.1 and not more than 0.9.

In the embodiment, a machine learning model is generated using multiple data including a set including, for example, a classification label and a feature scaled feature vector as the training data. At this time, the number of the first feature vectors corresponding to the first class is made different from the number of the multiple second feature vectors corresponding to the second class. For example, multiple feature vectors may be linearly or non-linearly mapped in the feature space. Using the classifier generated in the generated machine learning model, the classification of different data (different features) is predicted. Such an operation is performed in the processor 70.

The data processing device 110 (and the data processing system 210) according to the embodiment can be applied to, for example, a classification problem (failure prediction) by machine learning. In the embodiment, the number of data to be the training data is different between the classes. The inter-class ratio of numbers is not 1:1. The inter-class ratio of numbers is adjusted. Thereby, the true positive and the true negative of the prediction model can be adjusted. In the embodiment, the true positive and the true negative of the prediction model may be adjusted by hyperparameter adjustment. In the embodiment, a highly accurate true positive and true negative, which cannot be obtained only by hyperparameter adjustment, can be obtained.

The data processing system 210 (see FIG. 1) according to the embodiment includes one or multiple processors 70 (see FIG. 1). The processor 70 in the data processing system 210 is configured to perform the above-mentioned operation described with respect to the data processing device 110.

Second Embodiment

The second embodiment relates to a program. The program causes the processor 70 (computer) to acquire multiple first features corresponding to the first classification label and multiple second features corresponding to the second classification label. The program causes the processor 70 to select at least a part of the multiple first features from the multiple first features and at least a part of the multiple second features from the multiple second features. The program causes the processor 70 to perform the first operation OP1. In the first operation, the first number of the above-mentioned at least a part of the selected multiple first features is not less than 1.1 times and not more than 2 times the second number of the above-mentioned at least a part of the selected multiple second features. The program causes the processor 70 to generate the first machine learning model based on the first training data based on the above-mentioned at least a part of the selected multiple first features and the above-mentioned at least a part of the selected multiple second features.

The embodiment may include a storage medium in which the above program is stored.

Third Embodiment

The third embodiment relates to a data processing method. The data processing method causes the processor 70 to acquire multiple first features corresponding to the first classification label and multiple second features corresponding to the second classification label. The data processing method causes the processor 70 to select at least a part of the multiple first features from the multiple first features, and at least a part of the multiple second features from the multiple second features. The data processing method causes the processor 70 to perform the first operation OP1. In the first operation OP1, the first number of the above-mentioned at least a part of the selected multiple first features is not less than 1.1 and not more than the second number of the above-mentioned at least a part of the selected multiple second features. The data processing method causes the processor 70 to generate the first machine learning model based on the first training data based on the above-mentioned at least a part of the selected multiple first features and the above-mentioned at least a part of the selected multiple second features.

The embodiment may include the following configurations (e.g., technical proposals).

Configuration 1

A data processing device, comprising:

a processor, the processor being configured to acquire a plurality of first features corresponding to a first classification label and a plurality of second features corresponding to a second classification label, the processor being configured to select at least a part of the plurality of first features from the plurality of first features, being configured to select at least a part of the plurality of second features from the plurality of second features, and being configured to perform a first operation, in the first operation, a first number of the at least a part of the selected plurality of first features being not less than 1.1 times and not more than 2 times a second number of the at least a part of the selected plurality of second features, the processor being configured to generate a first machine learning model based on first training data based on the at least a part of the selected plurality of first features and the at least a part of the selected plurality of second features.

Configuration 2

The data processing device according to Configuration 1, wherein the processor is further configured to acquire a plurality of third features corresponding to the first classification label and a plurality of fourth features corresponding to the second classification label, the processor is configured to select at least a part of the plurality of third features from the plurality of third features, is configured to select at least a part of the plurality of fourth features from the plurality of fourth features, and the processor is configured to perform a second operation, in the second operation, a third number of the at least a part of the selected plurality of third features is not less than 0.1 times and not more than 0.9 times a fourth number of the at least a part of the selected plurality of fourth features, and the processor is further configured to generate a second machine learning model based on second training data based on the at least a part of the selected plurality of third features and the at least a part of the selected plurality of fourth features.

Configuration 3

The data processing device according to Configuration 2, wherein a plurality of target events include a plurality of third events corresponding to the first classification label and a plurality of fourth events corresponding to the second classification label, and in the second operation, a third incidence of the plurality of third events in the plurality of events is lower than a fourth incidence of the plurality of fourth events in the plurality of events.

Configuration 4

The data processing device according to Configuration 3, wherein in the second operation, the third incidence corresponds to an incidence of a normal product of an object, and the fourth incidence corresponds to an incidence of a non-normal product of the object.

Configuration 5

The data processing device according to Configuration 1 or 2, wherein a plurality of target events include a plurality of first events corresponding to the first classification label and a plurality of second events corresponding to the second classification label, and in the first operation, a first incidence of the plurality of first events in the plurality of events is higher than a second incidence of the plurality of second events in the plurality of events.

Configuration 6

The data processing device according to Configuration 5, wherein in the first operation, the first incidence corresponds to an incidence of a normal product of an object, and the second incidence corresponds to an incidence of a non-normal product of the object.

Configuration 7

The data processing device according to any one of Configurations 1 to 6, wherein the first training data are based on a plurality of quantities obtained by performing feature scaling process on the plurality of first features, and a plurality of quantities obtained by performing feature scaling process on the plurality of second features.

Configuration 8

The data processing device according to Configuration 7, wherein the feature scaling process includes at least one of normalization or standardization.

Configuration 9

The data processing device according to any one of Configurations 1 to 8, wherein the generation of the first machine learning model includes a mapping operation of the at least a part of the selected plurality of first features and the at least a part of the plurality of second features to a feature space.

Configuration 10

The data processing device according to Configuration 9, wherein the mapping operation includes at least one operation of a kernel function, t-SNE (t-Distributed Stochastic Neighbor Embedding), or UMAP (Uniform Manifold Approximation and Projection).

Configuration 11

The data processing device according to Configuration 10, wherein the kernel function may include, for example, at least one of a linear kernel, a polynomial kernel, a Gaussian kernel, a sigmoid kernel, a Laplace kernel, or a Matern kernel.

Configuration 12

The data processing device according to Configuration 9 or 10, wherein the generation of the first machine learning model includes derivation of a first classifier of a quantity after the mapping operation, the first classifier relating to the first classification label and the second classification label.

Configuration 13

The data processing device according to Configuration 12, wherein the derivation of the first classifier is based on at least one of SVM (Support Vector Machine) and neural network (NN), SDG (Stochastic Gradient Descent) Classifier, kNN (k-Nearest Neighbor) Classifier, or Naive Bayes classifier.

Configuration 14

The data processing device according to Configuration 12 or 13, wherein the processor is further configured to perform classification operation, and in the classification operation, the processor classifies an other feature into the first classification label or the second classification label based on the first classifier.

Configuration 15

The data processing device according to any one of Configurations 1 to 13, wherein the processor is further configured to perform classification operation, and in the classification operation, the processor classifies an other feature into the first classification label or the second classification label based on the first machine learning model.

Configuration 16

The data processing device according to Configuration 14 or 15, wherein the other feature is obtained by feature scaling new data obtained by the processor.

Configuration 17

The data processing device according to any one of Configurations 1 to 16, wherein the generation of the first machine learning model includes adjustment of hyperparameters.

Configuration 18

The data processing device according to any one of Configurations 1 to 17, wherein the plurality of first features and the plurality of second features relate to characteristics of a magnetic recording device.

Configuration 19

A data processing system, comprising:

one or a plurality of processors, the processors being configured to acquire a plurality of first features corresponding to a first classification label and a plurality of second features corresponding to a second classification label, the processors being configured to select at least a part of the plurality of first features from the plurality of first features, being configured to select at least a part of the plurality of second features from the plurality of second features, and being configured to perform a first operation, in the first operation, a first number of the at least a part of the selected plurality of first features being not less than 1.1 times and not more than 2 times a second number of the at least a part of the selected plurality of second features, the processors being configured to generate a first machine learning model based on first training data based on the at least a part of the selected plurality of first features and the at least a part of the selected plurality of second features.

Configuration 20

A storage medium storing a program, the program comprising:

causing the processor to acquire a plurality of first features corresponding to a first classification label and a plurality of second features corresponding to a second classification label;

causing the processor to select at least a part of the plurality of first features from the plurality of first features and to select at least a part of the plurality of second features from the plurality of second features, and to perform a first operation, in the first operation, a first number of the at least a part of the selected plurality of first features being not less than 1.1 times and not more than 2 times a second number of the at least a part of the selected plurality of second features; and causing the processor to generate a first machine learning model based on a first training data based on the at least a part of the selected plurality of first features and the at least a part of the selected plurality of second features.

Configuration 21

A program, comprising:

causing the processor to acquire a plurality of first features corresponding to a first classification label and a plurality of second features corresponding to a second classification label;

causing the processor to select at least a part of the plurality of first features from the plurality of first features and to select at least a part of the plurality of second features from the plurality of second features, and to perform a first operation, in the first operation, a first number of the at least a part of the selected plurality of first features being not less than 1.1 times and not more than 2 times a second number of the at least a part of the selected plurality of second features; and causing the processor to generate a first machine learning model based on a first training data based on the at least a part of the selected plurality of first features and the at least a part of the selected plurality of second features.

Configuration 22

A data processing method, comprising:

causing the processor to acquire a plurality of first features corresponding to a first classification label and a plurality of second features corresponding to a second classification label;

causing the processor to select at least a part of the plurality of first features from the plurality of first features and to select at least a part of the plurality of second features from the plurality of second features, and to perform a first operation, in the first operation, a first number of the at least a part of the selected plurality of first features being not less than 1.1 times and not more than 2 times a second number of the at least a part of the selected plurality of second features; and causing the processor to generate a first machine learning model based on a first training data based on the at least a part of the selected plurality of first features and the at least a part of the selected plurality of second features.

According to the embodiment, a data processing device, a data processing system, and a data processing method can be provided, in which the accuracy is possible to be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in data processing devices such as processors, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all data processing devices, data processing systems, and data processing methods practicable by an appropriate design modification by one skilled in the art based on the data processing devices, the data processing systems, and the data processing methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A data processing device, comprising:

a processor, the processor being configured to acquire a plurality of first features corresponding to a first classification label and a plurality of second features corresponding to a second classification label, the processor being configured to select at least a part of the plurality of first features from the plurality of first features, being configured to select at least a part of the plurality of second features from the plurality of second features, and being configured to perform a first operation, in the first operation, a first number of the at least a part of the selected first features being not less than 1.1 times and not more than 2 times a second number of the at least a part of the selected second features, and the processor being configured to generate a first machine learning model based on first training data based on the at least a part of the selected first features and the at least a part of the selected second features, wherein the processor is configured to acquire a plurality of third features corresponding to the first classification label and a plurality of fourth features corresponding to the second classification label, the processor is configured to select at least a part of the plurality of third features from the plurality of third features, is configured to select at least a part of the plurality of fourth features from the plurality of fourth features, and the processor is configured to perform a second operation, in the second operation, a third number of the at least a part of the selected third features is not less than 0.1 times and not more than 0.9 times a fourth number of the at least a part of the selected fourth features, the processor is configured to generate a second machine learning model based on second training data based on the at least a part of the selected third features and the at least a part of the selected fourth features, generation of the first machine learning model includes a mapping operation of the at least a part of the selected first features and the at least a part of the plurality of second features to a feature space, and generation of the first machine learning model includes derivation of a first classifier of a quantity after the mapping operation, the first classifier relating to the first classification label and the second classification label.

2. The device according to claim 1, wherein a plurality of target events include a plurality of third events corresponding to the first classification label and a plurality of fourth events corresponding to the second classification label, and in the second operation, a third incidence of the plurality of third events in the plurality of target events is lower than a fourth incidence of the plurality of fourth events in the plurality of target events.

3. The device according to claim 2, wherein in the second operation, the third incidence corresponds to an incidence of a normal product of an object, and the fourth incidence corresponds to an incidence of a non-normal product of the object.

4. The device according to claim 1, wherein a plurality of target events include a plurality of first events corresponding to the first classification label and a plurality of second events corresponding to the second classification label, and in the first operation, a first incidence of the plurality of first events in the plurality of target events is higher than a second incidence of the plurality of second events in the plurality of target events.

5. The device according to claim 4, wherein in the first operation, the first incidence corresponds to an incidence of a normal product of an object, and the second incidence corresponds to an incidence of a non-normal product of the object.

6. The device according to claim 1, wherein the first training data are based on a plurality of quantities obtained by performing feature scaling process on the plurality of first features, and a plurality of quantities obtained by performing feature scaling process on the plurality of second features.

7. The device according to claim 6, wherein the feature scaling process includes at least one of normalization or standardization.

8. The device according to claim 1, wherein the mapping operation includes at least one operation of a kernel function, t-SNE (t-Distributed Stochastic Neighbor Embedding), or UMAP (Uniform Manifold Approximation and Projection).

9. The device according to claim 8, wherein the kernel function includes at least one of a linear kernel, a polynomial kernel, a Gaussian kernel, a sigmoid kernel, a Laplace kernel, or a Matern kernel.

10. The device according to claim 1, wherein the derivation of the first classifier is based on at least one of SVM (Support Vector Machine) and neural network (NN), SDG (Stochastic Gradient Descent) Classifier, kNN (k-Nearest Neighbor) Classifier, or Naive Bayes classifier.

11. The device according to claim 1, wherein the processor is further configured to perform classification operation, and in the classification operation, the processor classifies an other feature into the first classification label or the second classification label based on the first classifier.

12. The device according to claim 11, wherein the other feature is obtained by feature scaling new data obtained by the processor.

13. The device according to claim 1, wherein the processor is further configured to perform classification operation, and in the classification operation, the processor classifies an other feature into the first classification label or the second classification label based on the first machine learning model.

14. The device according to claim 1, wherein the generation of the first machine learning model includes adjustment of hyperparameters.

15. The device according to claim 1, wherein the plurality of first features and the plurality of second features relate to characteristics of a magnetic recording device.

16. A data processing system, comprising:

one or a plurality of processors, the processors being configured to acquire a plurality of first features corresponding to a first classification label and a plurality of second features corresponding to a second classification label, the processors being configured to select at least a part of the plurality of first features from the plurality of first features, being configured to select at least a part of the plurality of second features from the plurality of second features, and being configured to perform a first operation, in the first operation, a first number of the at least a part of the selected first features being not less than 1.1 times and not more than 2 times a second number of the at least a part of the selected second features, the processors being configured to generate a first machine learning model based on first training data based on the at least a part of the selected first features and the at least a part of the selected second features, the processors being configured to acquire a plurality of third features corresponding to the first classification label and a plurality of fourth features corresponding to the second classification label, the processors being configured to select at least a part of the plurality of third features from the plurality of third features, is configured to select at least a part of the plurality of fourth features from the plurality of fourth features, and the processors being configured to perform a second operation, in the second operation, a third number of the at least a part of the selected third features is not less than 0.1 times and not more than 0.9 times a fourth number of the at least a part of the selected fourth features, and the processors being configured to generate a second machine learning model based on second training data based on the at least a part of the selected third features and the at least a part of the selected fourth features, wherein generation of the first machine learning model includes a mapping operation of the at least a part of the selected first features and the at least a part of the plurality of second features to a feature space, and generation of the first machine learning model includes derivation of a first classifier of a quantity after the mapping operation, the first classifier relating to the first classification label and the second classification label.

17. A data processing method, comprising:

causing a processor to acquire a plurality of first features corresponding to a first classification label and a plurality of second features corresponding to a second classification label;

causing the processor to select at least a part of the plurality of first features from the plurality of first features and to select at least a part of the plurality of second features from the plurality of second features, and to perform a first operation, in the first operation, a first number of the at least a part of the selected first features being not less than 1.1 times and not more than 2 times a second number of the at least a part of the selected second features; and causing the processor to generate a first machine learning model based on a first training data based on the at least a part of the selected first features and the at least a part of the selected second features, wherein the method comprises causing the processor to acquire a plurality of third features corresponding to the first classification label and a plurality of fourth features corresponding to the second classification label, causing the processor to select at least a part of the plurality of third features from the plurality of third features, to select at least a part of the plurality of fourth features from the plurality of fourth features, and to perform a second operation, in the second operation, a third number of the at least a part of the selected third features is not less than 0.1 times and not more than 0.9 times a fourth number of the at least a part of the selected fourth features, and causing the processor to generate a second machine learning model based on second training data based on the at least a part of the selected third features and the at least a part of the selected fourth features, generation of the first machine learning model includes a mapping operation of the at least a part of the selected first features and the at least a part of the plurality of second features to a feature space, and generation of the first machine learning model includes derivation of a first classifier of a quantity after the mapping operation, the first classifier relating to the first classification label and the second classification label.

\* \* \* \* \*